United States Patent
Kimelman

[11] Patent Number: 5,921,515
[45] Date of Patent: Jul. 13, 1999

[54] HOLDING DEVICE

[76] Inventor: Michael Kimelman, 8 Lydecker Pl., Middlesex, N.J. 08846

[21] Appl. No.: 08/823,073

[22] Filed: Mar. 24, 1997

[51] Int. Cl.⁶ ..................................................... F16M 13/00
[52] U.S. Cl. .................................... 248/205.8; 248/205.5; 248/206.5; 224/324
[58] Field of Search ............................ 248/205.8, 205.1, 248/205.5, 205.9, 363, 206.5; 224/324, 309

[56] References Cited

U.S. PATENT DOCUMENTS

| | | | |
|---|---|---|---|
| 3,020,017 | 2/1962 | Watson | 248/205.8 X |
| 3,747,170 | 7/1973 | Kieves | 248/205.8 X |
| 4,012,007 | 3/1977 | Cunningham | 248/205.8 X |
| 4,262,890 | 4/1981 | Sisko et al. | 248/205.8 X |
| 4,844,395 | 7/1989 | Perentin | 248/205.8 |
| 5,386,960 | 2/1995 | O'Brien | 248/205.5 |
| 5,423,466 | 6/1995 | Moon | 248/205.8 X |
| 5,511,751 | 4/1996 | Shen | 248/205.8 |
| 5,516,019 | 5/1996 | Moon | 248/205.8 X |
| 5,630,517 | 5/1997 | Maznik | 248/205.2 X |

Primary Examiner—Derek J. Berger
Assistant Examiner—Long Dinh Phan
Attorney, Agent, or Firm—Ilya Zborovsky

[57] ABSTRACT

A holding device for holding objects has a substantially cupshaped housing having an open side, an elastic element connected with the housing and closing the open side, at least one projection extending from the elastic element inwardly of the housing, a turning element extending through the projection and having a portion extending outwardly of the housing, the turnable element being turnable by a user who grasps the outer portion of the turning element between a first position in which it concave toward the diaphragm and the diaphragm is concavely displaced into the housing and a second position in which the turning element is convex toward the housing and the diaphragm convexly bulges out of the housing so as to press out air between the diaphragm and a surface in which the holding device is to be attached, and elements provided on the housing for retaining an object.

3 Claims, 1 Drawing Sheet

HOLDING DEVICE

BACKGROUND OF THE INVENTION

The present invention generally relates to holding devices, and in particular to devices for holding objects on automobiles.

Devices of the above mentioned general type are known in the art. Some of such devices are disclosed for example in U.S. Pat. Nos. 4,043,531, 4,029,370, 3,863,568, 3,750,991. These devices can be further improved.

SUMMARY OF THE INVENTION

Accordingly, it is an object of the present invention to provide a holding device which is a further improvement of the existing devices.

In keeping with these objects and with others which will become apparent hereinafter, one feature of present invention resides, briefly stated, in a holding device which has a cup-shaped housing with one open side, an elastic diaphragm arranged on the open side of the housing and closing the housing, a projection extending substantially from a central region of the diaphragm and having an opening, and a substantially curved turning element extending through the opening and outwardly of the housing and turnable by the user between a first position in which it is substantially convex toward the diaphragm and the diaphragm is substantially flat to be applied on a surface and a second position in which said turning element is substantially convexed toward the diaphragm and pulls the diaphragm into the housing so as to create suction between the surface and the diaphragm.

When the device is designed in accordance with the present invention, it is a further improvement of the existing devices.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 2:
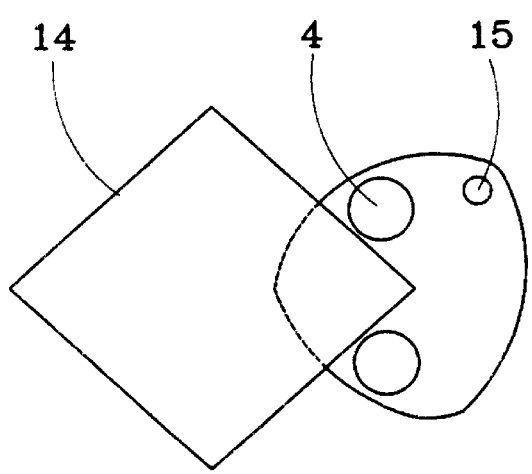
FIG. 2 is a top view of the inventive holding device in accordance with FIG. 1.

A holding device in accordance with present invention has a housing which is identified as a whole with reference numeral 1. The housing 1 can be cup-shaped and can have a triangular contour as shown in FIG. 2. The housing 1 has an upper wall 2 and a peripheral wall 3. The upper wall 2 is provided with a plurality of legs, preferably two legs 4 which are spaced from one another. The peripheral wall 3 is provided with two opposite and aligned openings 5 which are formed as throughgoing openings. An open side of the housing 2 is closed by an elastic diaphragm 6 composed for example of rubber and the like. Two projections 7 extend from the diaphragm into the interior of the housing 2 and are spaced from one another. The diaphragm 6 is connected with the peripheral wall of the housing 3 for example by gluing, vulcanizing, etc. in the region of its edge 8.

The holding device further has a turning member which is identified with reference numeral 9. The turning member has a central portion 10 which is substantially straight and two side portions 11 which are substantially curved. Also, the turning member 9 has a portion extending outwardly of the housing and provided with a handle 12. The projections 7 have openings 13 which are aligned with one another. The openings 13 of the projections 7 are offset toward the diaphragm 6 from the openings 5 in the peripheral wall of the housing.

Figure 1:
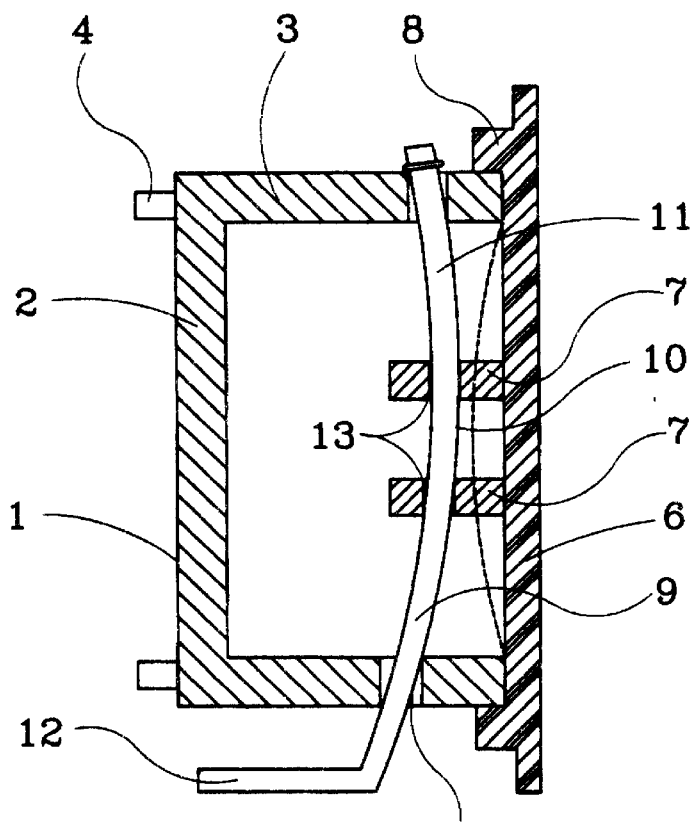
FIG. 1 is a view showing a section of a holding device in accordance with present invention.
Figure 3:
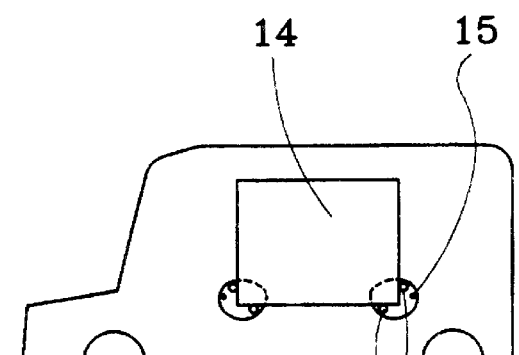
FIG. 3 is a view showing a side of an automobile on which an object is held by two holding devices in accordance with present invention.

The holding device operates in a following manner. The holding device is applied with its diaphragm 6 on a surface 13 in a position in which the turning element 9 is turned to assume a convex position toward the diaphragm 6 as shown in a broken line in FIG. 1. Then a user turns the handle 12 and therefore the turning member 9 to the position shown in solid lines in FIG. 1 in which the turning member 9 is convexed toward the diaphragm 6. Air between the diaphragm and the surface 13 is pressed out and the diaphragm is firmly adhered to the surface 13. An object 14 is then introduced between the legs 4 so as to be fixed between them, while an opposite corner of the object 14 can be introduced between the legs 4 of another holding device, as shown in FIG. 3. The object 14 is retained between the legs 4 of two holding devices. An opening 15 is provided for a hook of rope to additionally tie the object.

It will be understood that each of the elements described above, or two or more together, may also find a useful application in other types of constructions differing from the types described above.

While the invention has been illustrated and described as embodied in holding device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holding device for holding objects, comprising a substantially cup-shaped housing having an open side; an elastic element connected with said housing and closing said open side; at least one project on extending from said elastic element inwardly of said housing; a turning element extending through said projection and having a portion extending outwardly of said housing, said turning element being turnable by a user who grasps an outer portion of said turning element between a first position in which it concave toward said elastic element and said elastic element is concavely displaced into said housing and a second position in which said turning element is convex toward said housing and said elastic element convexly bulges out of said housing so as to press out air between said elastic element and a surface in which the holding device is to be attached; and means provided on said housing for retaining an object; at least two projections spaced from said first mentioned projection and connected with said elastic element, said projections have two aligned openings, said turning element having a central portion which is substantially straight and extends through said openings of said projections and two outer portions which are curved said means for retaining an object include at least two legs located opposite to one another, said projections being spaced from one another in a first direction, said legs being spaced from one another also in said first direction, said projections extending from said elastic element in a second direction which is perpendicular to said first direction, said legs extending from said housing also in said second direction, said projections extending from a surface of said elastic element facing in said second direction, said legs extending from a surface of said housing also facing in said second direction.

2. A holding device as defined in claim 1, wherein said housing has a peripheral wall provided with two opposite openings, said turning element has two end portions extending through said openings of said peripheral wall of said housing, said openings of said projections being offset relative to said openings of said peripheral wall of said housing toward said elastic element.

3. A holding device as defined in claim 1, wherein said turning element has the central substantially straight portion, the two curved portions extending at opposite sides from said central straight portion, and an exterior portion extending from one of said end portions outwardly of said housing, said exterior portion being bent substantially transversely to a remaining part of said turning member.

* * * * *